United States Patent [19]

Meyers et al.

[11] 3,902,076

[45] Aug. 26, 1975

[54] GENERATOR MONITORING CIRCUIT

[75] Inventors: Elwood J. Meyers; George H. Anderson, both of Rockford, Ill.

[73] Assignee: Barber-Colman Company, Rockford, Ill.

[22] Filed: Aug. 12, 1974

[21] Appl. No.: 496,521

[52] U.S. Cl. .................. 307/57; 322/28; 290/4 A
[51] Int. Cl. .............................. H02j 3/38
[58] Field of Search ........ 307/57, 47; 290/4 R, 4 A, 290/40 B

[56] References Cited
UNITED STATES PATENTS

| | | | |
|---|---|---|---|
| 2,914,680 | 11/1959 | Rubinstein | 290/4 A |
| 2,986,647 | 5/1961 | Britten | 307/57 |

*Primary Examiner*—Robert K. Schaefer
*Assistant Examiner*—M. Ginsburg
*Attorney, Agent, or Firm*—William T. Rifkin

[57] ABSTRACT

A circuit for monitoring the output of a power generator is disclosed. The circuit utilizes a current sensing transformer for each of the three phases of the power generator. The current is sensed, and after compensation for phase angle, is summed and provided to a bridge network. A difference amplifier connected to the bridge network produces a difference signal representative of the voltage across the bridge network. The difference signal is supplied to a speed governor. By interconnecting additional circuits a plurality of generators may be regulated to maintain a substantially equal load on each. The use of a difference amplifier provides the capability of intermixing speed governors having different D.C. reference levels. A low pass filter network for high frequency noise rejection is provided.

4 Claims, 2 Drawing Figures

3,902,076

GENERATOR MONITORING CIRCUIT

BACKGROUND OF THE INVENTION

This invention relates to the field of regulators for dynamo electric machines and, more particularly, to means for regulating the output of a number of alternating current generators to insure a predetermined distribution of load.

Where a plurality of alternating current generators are provided, there are distinct advantages in providing for a uniform distribution of load between them. For example, if a number of generators are equally sharing a current load requirement, an additional load can be assumed at a faster response rate than if a single generator were required to assume the additional load. Another advantage is that the generator and its prime mover usually have greater efficiency near a full load. The uniform distribution of load assures that no generator is operating at a relatively low load and therefore at a relatively less efficient point.

It is known in the prior art to provide regulating circuits to distribute a load and, for example, U.S. Pat. Nos. 2,914,680 and 2,986,647 disclose circuits which are capable of regulating A.C. current generators. Such prior art devices typically employ current sensing means for each phase of the three-phase power generator and bridge circuits for developing a control signal used to control a speed governor. Such prior circuits, however, usually require that all governors be of the same type and utilize the same D.C. reference level. Where governor equipment is not standardized, unsatisfactory results are obtained. Furthermore, such prior circuits are subject to erratic operation in the presence of high frequency noise including common mode interference (cross talk) often found in industrial environments.

It is accordingly an object of the present invention to provide a generator monitoring circuit which is capable of producing a control signal for maintaining a generator at a preselected load level.

It is another object to provide a circuit which can be connected to additional identical circuits to produce control signals to maintain an even load on a plurality of generators.

It is a further object of the present invention to provide a plurality of monitoring circuits each of which is isolated from the other such that a different D.C. reference level from each speed governor may be accommodated.

It is a further object of the present invention to provide a monitoring circuit which has a low output impedance and high common mode rejection to enhance noise reduction.

It is yet another object of the present invention to provide low pass filter means for the monitoring circuit to further reduce the effect of high frequency noise.

It is a further object to provide a difference amplifier to enhance common mode noise rejection and permit the adjustment of the D.C. reference level.

Other objects and advantages of the invention will become apparent from the remaining portion of the specification.

DETAILED DESCRIPTION

Figure 1:
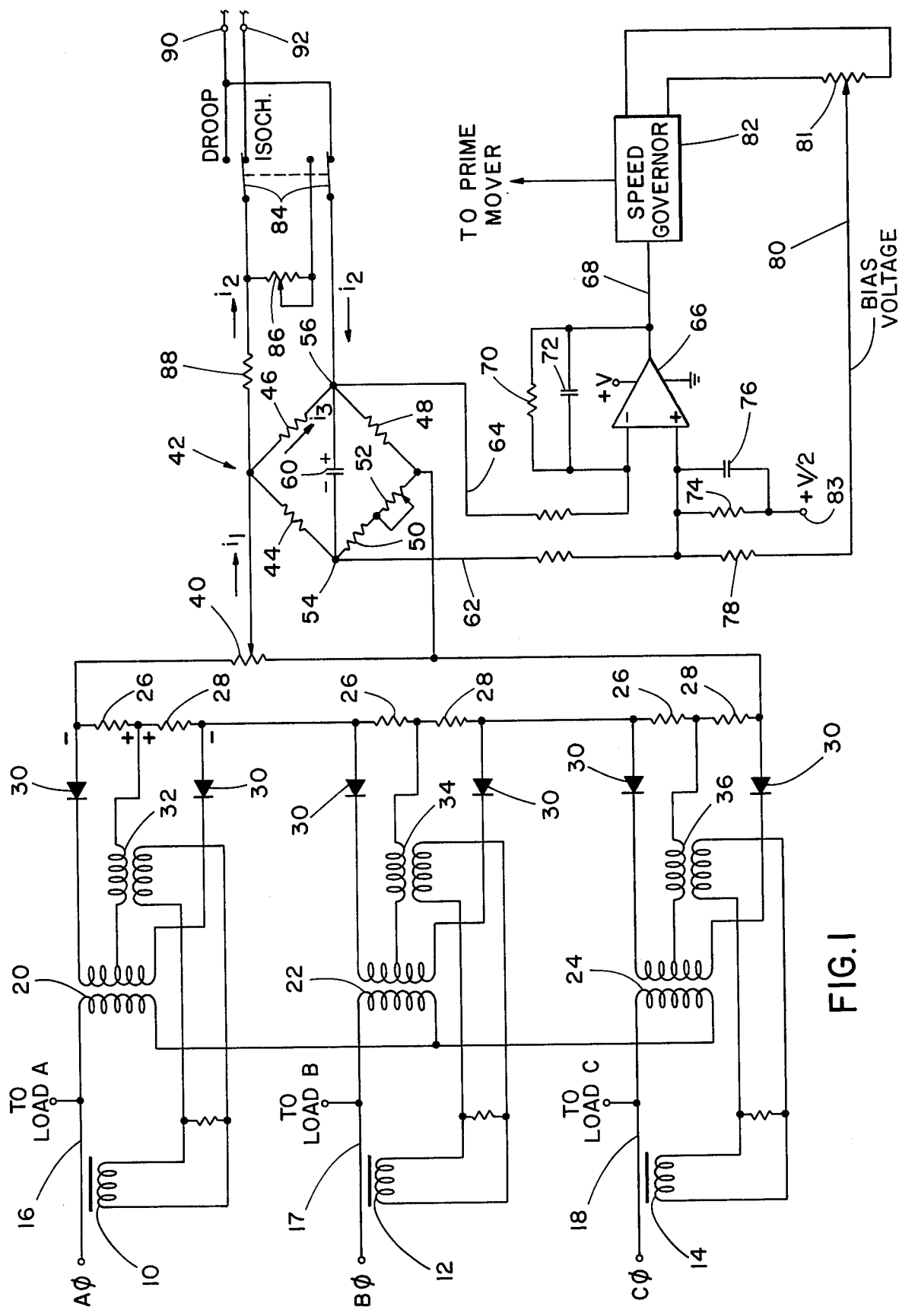
FIG. 1 is a schematic drawing of the monitoring circuit of the present invention.

Referring to FIG. 1, the monitoring circuit according to the present invention is shown. The circuit is adapted to sense the current flow in each phase of a three-phase A.C. current generator. For that purpose, a current sensing transformer 10 is provided for the A phase. Similarly, transformers 12 and 14 are provided for the B and C phases.

Each of the three phases, 16, 17 and 18, is provided to the primary of transformers 20, 22 and 24, respectively. The secondaries of these transformers have a pair of resistors 26 and 28 connected thereacross. The diodes 30, with the secondaries of voltage transformer 20 and the resistors 26, 28, provide a full wave rectified current through the secondary of transformer 32, where its flow is aided or bucked by the voltage induced in the secondary in response to the sensed load current.

Connected to each of the current sensing transformers 10, 12 and 14 is the primary of transformers 32, 34 and 36, respectively. The secondary of these transformers is connected to the midpoint of transformers 20, 22 and 24 and the midpoint of resistors 26 and 28.

As thus far described, the circuit is effective for detecting the current in each of the three phases from a power generator via the current sensing transformers 10, 12 and 14. The current sensed by these transformers is provided to the transformers 32, 34 and 36. The voltage across the latter transformers varies as a function of the current detected by each current sensing transformer.

The current through the secondary of transformers 20, 22 and 24 is a function of the voltage for each phase and the magnitude of the resistors 26 and 28. For the purposes of the present invention, resistors 26 and 28 are preferably selected to be of equal value. Under normal conditions, when the load on each of the three phases remains constant, the current sensed by the sensing transformers is constant. An equal but opposite voltage is developed across the resistors 26 and 28 when there is no load current.

Should the current in a particular phase change (for example the A phase), transformer 32 will cause a change in the voltages across the resistors 26 and 28. If the current across the A phase increases, the voltage across resistor 28 will increase, while the voltage across resistor 26 will decrease. This arrangement effectively measures the true power output of each phase and accounts for power factor angle in a manner known in the art.

The net voltage produced by a current change in all three phases is provided across a summing resistor 40. Resistor 40 is connected as an input across a balanced bridge circuit 42. Bridge circuit 42 includes resistors 44 and 46 in the top legs and resistors 48, 50 and 52 in the bottom legs. Connected between points 54 and 56 is a capacitor 60. The voltage developed thereacross represents the difference signal developed by the bridge. The output from the bridge 42 is provided via lines 62 and 64 to the positive and negative inputs of difference amplifier 66.

Connected between the amplifier output 68 and its negative input is a low pass filter network comprising a resistor 70 and a capacitor 72. Similarly, connected to the positive input of amplifier 66 is a second low pass filter network comprising resistor 74 and capacitor 76. These networks are provided to reduce the high frequency noise which is usually present in a power generating environment. These filters may be set to pass signals of appropriate frequencies and, for example, D.C. to 10 Hz is satisfactory. Above this range signal attenuation progressively increases.

Connected to the positive input of amplifier 66 is a resistor 78 the other end of which is connected via potentiometer 81 to a speed governor 82. The potentiometer 81 controls a bias or reference voltage applied to the amplifier 66 to permit initial speed adjustment. Typically, such speed governors utilize a D.C. reference voltage on the order of 4 to 10 volts. The voltage utilized depends, however, upon the model and manufacturer. As will be subsequently explained, when two or more generators are running in a parallel load sharing mode, it is desirable to provide for the accommodation of speed governors which do not necessarily have identical D.C. reference levels.

The output from the difference amplifier 66 is provided on line 68 to the speed governor 82. The speed governor controls the speed of a prime mover, such as a diesel engine, to regulate the output of the particular generator which is being governed. Typically, a speed governor will regulate a fuel valve to the engine.

Referring again to the bridge network 42, it will be noted that a switching arrangement is connected across resistor 46. The switching arrangement includes a ganged switch 84, a variable resistor 86 and resistor 88. In the position illustrated in FIG. 1, the circuit is adapted to operate in an isochronous model. When an identical circuit is connected to points 90 and 92, for example, the circuit of FIG. 2, each circuit will operate to cause its associated speed governor to maintain an equal load on each of the generators.

Alternatively, when the switch 84 is in the upper position, the circuit operates in a droop mode, that is, the speed of the prime mover and hence the output of the generator drops as the load on the generator increases. The droop mode is necessary when one or more generators which are connected together are incapable of local control. For example, where a local generator is paralleled with a utility company source, it is necessary to permit the speed of the local unit to droop as the loading of the pair increases in order to maintain a substantially equal load distribution.

Before detailing the operation of the circuit, the novel results obtained from operational amplifier 66 will be considered. When a difference signal is generated by the bridge circuit 42 it is applied to the inputs of amplifier 66. Amplifier 66 sums the bridge output and the bias voltage at the D.C. reference level of the associated governor 82. Further, it provides a low output impedance producing increased noise rejection and reduced erratic operation, including greatly enhanced common mode noise rejection. Thus, in combination with the low pass filter network, the difference amplifier provides the capability of extremely effective noise rejection and permits the accommodation of different reference levels of the speed governors.

OPERATION

Considering first the operation of the circuit wherein only a single power generator is being controlled, the terminals 90 and 92 are not connected to any other points. The ganged switch 84 will be up so that the circuit is functioning in the droop mode. When the switch 84 is up, resistors 88 and 86 are paralleled across resistor 46 of the bridge circuit. A signal proportional to the load is produced across summing resistor 40 and applied to the bridge circuit 42.

When the load on the generator remains constant, the voltage across the capacitor 60 of the bridge circuit will remain constant at some positive value depending upon the load. In turn, this voltage is applied to the input terminals of the difference amplifier 66. The D.C. bias voltage provided on line 80 biases the amplifier 66 to a level equal to the D.C. reference level. Thus, when the load on the generator remains constant, the output of the amplifier 66 remains constant.

Should the load on the generator change, it is desired to alter the speed of the prime mover to compensate therefor. An increasing load produces an increase in voltage across resistor 40 and the bridge circuit effective for increasing the voltage on capacitor 60 in the sense marked on the drawing in FIG. 1. In turn, this change produces a decrease in the output from the difference amplifier 66. The amplifier output is therefore the D.C. reference level minus a small incremental voltage representing the change in load. This voltage is utilized by the governor 82 for reducing the speed of the prime mover to maintain the desired operating condition.

Operation in the isochronous mode with two or more identical circuits is accomplished by connecting such circuits to the terminals 90 and 92 of FIG. 1. The bridge terminal 56 of FIG. 1 is then connected via ganged switch 84, terminal 90, and ganged switch 100 (FIG. 2) to a terminal 102 of a bridge circuit for a second power generator. Similarly, the midpoint between resistors 44 and 46 of the bridge is connected via resistor 88, switch 84, terminal 92, switch 100 and resistor 104 to the midpoint of resistors 106 and 108.

While the drawings illustrate the connection of two monitoring circuits, it will be understood that a greater number of monitoring circuits can be similarly interconnected to terminals 90 and 92 and the operation will be as in the following description.

When the two circuits are connected in the isochronous mode, the bridge circuits are in effect coupled so that an increase in the output of one circuit will effect a corresponding decrease in the output of the other bridge circuit. When an increase in the load carried by one of the generators is detected by its monitoring circuit, an output signal is provided from its amplifier 66 effective for reducing the speed of the corresponding prime mover.

Simultaneously, the bridge circuit of the second power generator experiences a voltage change thereacross effective for increasing the speed of the second generator so as to carry more of the load. Thus a simultaneous movement of both generators towards an equilibrium load sharing position is obtained. When the load is equally shared, the outputs from all amplifiers are equal with respect to their reference levels.

A more detailed understanding of the bridge interaction may be had with reference to the currents indicated on the drawings. When a change in the generator being monitored by the FIG. 1 circuit is detected, a current I1 flows into the bridge circuit 42. In the isochronous mode, a portion of the current I1 will flow through resistor 88, the ganged switches 84 and 100, and resistor 104 to the bridge circuit of FIG. 2. This current is designated I2. A major portion of the I1 current will flow through resistor 46 and is designated I3. The described current flow is due to the relative values of resistors 46, 88 and 104. Preferably, 46 is at least three to six times larger than resistors 88 and 104 which are preferably of identical value.

Figure 2:
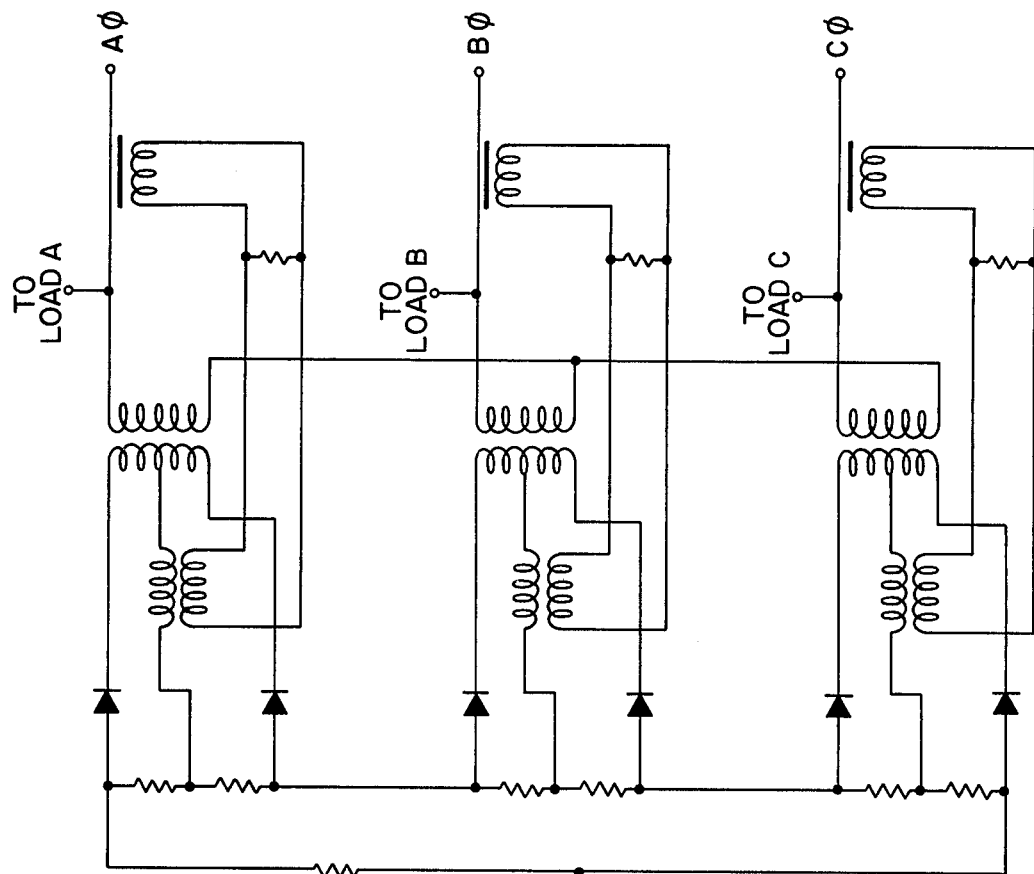
FIG. 2 is a circuit identical to that of FIG. 1 adapted to be connected to the FIG. 1 circuit for controlling two A.C. generators operating in a parallel load sharing arrangement.
Figure 2:
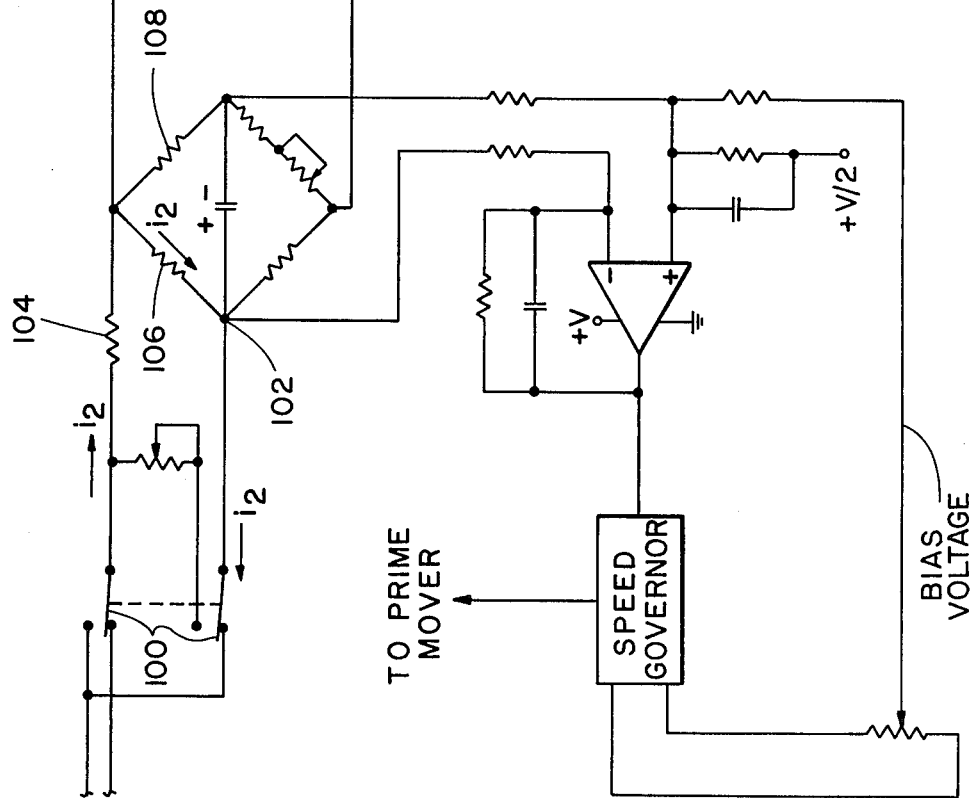

The current I2 provided to the bridge circuit of FIG. 2 then passes through resistor 106 to the terminal 102. From this point there is a direct path back to the terminal 56 of the bridge of FIG. 1 via the terminal 90. Thus, current I2 is diverted from resistor 46 but still flows through resistor 48 increasing the voltage at terminal 56 with respect to terminal 54 causing the output of amplifier 66 to be reduced to slow the prime mover. At the same time current I2 flowing through resistor 106 lowers the voltage at terminal 102 of FIG. 2 and so increases the output of the associated amplifier to increase the speed of its associated prime mover. The current path thus created in the isochronous mode produces the aforementioned equal but opposite movement towards an equilibrium position when an imbalance is detected in either of the generators.

When the ganged switches 84 and 100 are in the droop mode position, the speed of the controllable generators is reduced to match increased loading. The operation of the circuit under the circumstances is similar to that described with regard to the regulation of a single generator.

While we have shown and described embodiments of this invention in some detail, it will be understood that this description and illustrations are offered merely by way of example, and that the invention is to be limited in scope only by the appended claims.

We claim:

1. A system for maintaining substantially equal loads on a plurality of power generators, said system including a separate speed governor for controlling each of said generators; a monitoring circuit for each of said generators including a current sensing transformer network; and a bridge network to which the transformer network is connected to produce an output representative of the current from each generator; the improvement comprising for each of said generators:
    a. means preset to a particular reference voltage level associated with a particular type speed governor receiving the output from said bridge network for producing and applying a control signal to said particular type speed governor at substantially said particular reference voltage level; and
    b. means for interconnecting said bridge networks so that a voltage change on a first bridge produces a compensating voltage change on the remaining bridges so as to maintain substantially equal loads.

2. The system according to claim 1 wherein said reference voltage levels of said speed governors are different.

3. The system according to claim 1 wherein said preset means is a difference amplifier.

4. The system according to claim 1 wherein said monitoring circuits further include low pass filter means for rejecting high frequency noise.

* * * * *